Patented Dec. 17, 1935

2,024,407

UNITED STATES PATENT OFFICE 2,024,407

CERAMIC FLUX AND PROCESS OF MAKING SAME

Joseph H. Weis, Scranton, Pa., assignor to Feldspathic Research Corporation, New York, N. Y., a corporation of Delaware No Drawing. Application January 6, 1934, Serial No. 705,627

9 Claims. (Cl. 106—11)

This invention relates to ceramic fluxes and has for its object to provide novel and controllable fluxes, particularly as vitrifying agents in whiteware, wall tile, etc. Difficulty has heretofore been encountered in the tendency, especially with wall tile, to dish or warp under fire. Such dishing or warping results in a large number of seconds, and it is desirable to produce as much No. 1 grade as possible. Another quality desired in the flux is to produce an open, porous body for glazing and lightness. A well known flux for such purpose is English Cornwall stone, which is imported from England, but which varies in composition and contains various impurities.

In the western part of North Carolina are located deposits of partially decomposed or kaolinized pegmatites which vary in character. For instance, some indicate only a slight decomposition, and can be used as feldspar, while others have been completely kaolinized and are used as sources of commercial kaolin. When used as feldspar, it must be recoverable commercially and the kaolin with its attendant impurities removed at a cost to compete with other feldspars obtained from deposits not showing any signs of alteration.

Up to the present time these large deposits of partially decomposed or kaolinized pegmatites have had no commercial or utilitarian value for the following reasons:

As a source of kaolin, the contents of quartz, feldspar and mica, together with other iron-bearing minerals (as indicated in subsequent analyses) are too great to make the process competitive with existing kaolin deposits where the kaolin is concentrated in large, relatively pure masses and requires generally only a simple washing operation.

As a source of feldspar, the feldspar content is generally not high enough, and as the kaolin must be washed out, the process is too costly, because feldspar is processed in a dry state. Furthermore, the presence of large quantities of quartz makes this material impractical as a source of commercial feldspar because it acts as a diluent and causes increased refractoriness, whereas the feldspar is used as a flux and refractoriness is not desired.

Finally, the products obtained from these partially decomposed or kaolinized pegmatites are not uniform, as is indicated by numerous analyses.

According to this invention, I have devised a process whereby such decomposed or partially kaolinized pegmatites can be purified, and with other materials added according to requirements, provide a very useful flux and vitrifying agent of controllable and predetermined composition having several advantages over English Cornwall stone as imported into this country.

Chemical and mineralogical analyses of four partially decomposed or kaolinized pegmatites found in the North Carolina section above referred to, show the following limits in analysis:

|  | Per cent |
|---|---|
| $SiO_2$ | 58.93–72.20 |
| $Al_2O_3$ | 17.69–26.74 |
| $Fe_2O_3$ | 0.10– 0.21 |
| $CaO$ | 0.18– 1.70 |
| $MgO$ | 0.01– 0.03 |
| $K_2O$ | 2.18–12.30 |
| $Na_2O$ | 1.55– 4.86 |
| Loss | 0.75– 6.25 |

Mineralogical analyses calculated from the above showed the following limits in composition:

|  | Per cent |
|---|---|
| Potash spar | 12.9–72.9 |
| Soda spar | 13.2–40.4 |
| Lime spar | 0.9– 8.5 |
| Quartz | 6.2–27.4 |
| Kaolin | 7.1–38.3 |
| Other minerals | 0 – 3.2 |

The other ingredients necessary to be combined with the semi-kaolinized pegmatite are flint, one or more feldspars, and in some instances a small amount of calcium carbonate such as marble.

|  | #1 spar | #5 spar | Semi-kaolinized pegmatite | Flint |
|---|---|---|---|---|
|  | Per cent | Per cent | Per cent | Per cent |
| $SiO_2$ | 69.12 | 70.20 | 60.74 | 97.54 |
| $Al_2O_3$ | 18.04 | 18.10 | 25.65 | 1.77 |
| $Fe_2O_3$ | .08 | .10 | .15 | .03 |
| $CaO$ | .98 | 1.16 | 1.06 |  |
| $MgO$ | Trace. | Trace. | Trace. |  |
| $K_2O$ | 6.70 | 4.35 | 2.88 |  |
| $Na_2O$ | 5.14 | 5.98 | 4.78 |  |
| Loss | .30 | .31 | 4.64 | .10 |
| Total | 100.36 | 100.20 | 99.90 | 99.44 |

A suitable mix is as follows:

|  | Per cent |
|---|---|
| Semi-kaolinized pegmatite | 27 |
| Flint | 23 |
| Spar #1 | 30 |
| Spar #5 | 18 |
| $CaCO_3$ or $CaF_2$ | 2 |
|  | 100 |

When these materials are taken to give an analysis as follows:

| | Percent |
|---|---|
| $SiO_2$ | 70–74 |
| $Al_2O_3$ | 15–17 |
| $Fe_2O_3$ | .05–.15 |
| CaO | 1–3 |
| Mgo | |
| $K_2O$ | 2.5–4.5 |
| $Na_2O$ | 2.5–4.5 |
| Loss | 1.5–3 | a very useful flux of controllable composition for the purpose above described is obtained.

The partially decomposed or kaolinized pegmatites frequently contain hermatite, mica and other iron-bearing minerals which are removed, as well as tramp iron, by granulating, sizing and separating by passing through a high intensity magnetic separator such as the induction rotor type, whenever these impurities are present in amounts resulting in products having more than .10% $Fe_2O_3$.

My researches indicate that a flux of the following chemical and mineralogical analyses is very desirable for use in whiteware, especially wall tile. This composition produces very desirable results.

*Chemical analysis*

| | Percent |
|---|---|
| $SiO_2$ | 72.23 |
| $Al_2O_3$ | 16.43 |
| $Fe_2O_3$ | 0.10 |
| CaO | 2.24 |
| MgO | .01 |
| $K_2O$ | 4.03 |
| $Na_2O$ | 3.36 |
| Loss | 1.74 |

*Mineralogical analysis*

| | Percent |
|---|---|
| Potash feldspar | 23.8 |
| Soda feldspar | 26.4 |
| Lime feldspar | 11.2 |
| Quartz | 30.0 |
| Kaolin | 6.2 |
| Other minerals | 0.4 |

To produce fluxes of the desired composition, capable of being reproduced on order to meet specifications, the various decomposed pegmatites, feldspars, flint and calcium carbonate are stored in separate bins, according to analysis, and blended to produce the desired composition. If certain minerals are deficient to produce the desired composition, other products can be added to overcome this deficiency. For instance, if the analysis indicates a deficiency of potash feldspar, this can be overcome by the addition of this ingredient from a bin of known composition, and this is also true of the other feldspars, as well as quartz and kaolin.

The limestone or marble used produces desirable fluxing properties in this product. If there is a deficiency of calcium oxide, a feldspar rich in anorthite (lime feldspar) may be added to enrich the product, or limestone or lime may be used for the same purpose provided it is desired to increase the lime content without affecting the other ingredients.

Each of the various ingredients is handled separately, requiring separate mining, crushing and sampling operations, and stored in separate bins in order that their composition can be definitely determined for use in mixing.

From the storage bin for each material such as potash feldspar, soda feldspar, lime feldspar, quartz, decomposed pegmatites, kaolin and limestone, each material is crushed, and those requiring magnetic separation are granulated to a size sufficient to unlock the iron-bearing material, say from 20 mesh to 150 mesh, and then, usually in two or more sizes, over the magnetic separator. Then part of each material is taken by a sampler and the balance discharged to mixing bins of considerable capacity, eighty tons having been found convenient. As desired, each material is withdrawn in predetermined quantity from its bin, mixed and ground sufficiently to leave only about ½ of 1% on a 200 mesh screen, sampled for future reference and delivered to cars or bags for shipment.

A suitable wall tile batch for firing to cone 10 is as follows:

| | Parts |
|---|---|
| Ball clay | 22.00 |
| China clay | 30.25 |
| Flint | 25.00 |
| Flux | 12.00 |

These amounts can be varied plus or minus 20% depending on amount of heat used.

From the foregoing it will be seen that the resultant flux is highly advantageous for use in whiteware, especially wall tile, etc., and actual operating results have shown that it produces a product with less tendency to dish or warp under high temperatures, as compared to feldspar bodies, thus giving a substantial reduction in seconds. The novel flux of this application also produces an open body which is highly desirable for glazing and lightness, and with proper porosity. Comparative tests of my new flux with imported Cornwall stone gave better and more uniform results with my flux in both dry and wet pressed ware. Thereby a new use has been discovered for deposits of partially decomposed or kaolinized pegmatites which heretofore had no economic value.

The invention claimed is:

1. Process of producing a ceramic flux for whiteware, wall tile and the like, which comprises combining with partially kaolinized pegmatite, feldspar, lime and flint in such proportions as to produce a flux having the characteristics of English Cornwall stone and having a silica content of 70–74%, alumina of 15–17%, potash of 2.5–4.5%, soda of 2.5–4.5%, and lime of 1–3%, and having a $Fe_2O_3$ content of less than .1%.

2. Process of producing a ceramic flux for whiteware, wall tile and the like, which comprises combining with partially kaolinized pegmatite, feldspar and flint in such proportions as to provide a silica content of 70–74%, alumina of 15–17%, potash of 2.5–4.5%, and soda of 2.5–4.5%.

3. Process of producing a ceramic flux for whiteware, wall tile and the like, which comprises combining with partially kaolinized pegmatite, feldspar lime and flint in such proportions as to provide a silica content of 70–74%, alumina of 15–17%, potash of 2.5–4.5%, lime of 1–3%, and soda of 2.5–4.5%.

4. Process of producing a ceramic flux for whiteware, wall tile and the like, which comprises combining with partially kaolinized pegmatite, feldspar and flint in such proportions as to provide a silica content of 70–74%, alumina of 15–17%, potash of 2.5–4.5%, soda of 2.5–4.5%, and $Fe_2O_3$ of less than .1%.

5. Process of producing a ceramic flux for whiteware, wall tile and the like, which comprises combining with partially kaolinized pegmatite, a plurality of feldspars and flint in such proportions as to produce a flux having the characteristics of English Cornwall stone and having a silica content of 70–74%, alumina of 15–17%, potash of 2.5–4.5%, soda of 2.5–4.5%, and lime of 1–3%.

6. Process of producing a ceramic flux for whiteware, wall tile and the like, which comprises combining with partially kaolinized pegmatite, a plurality of feldspars and flint in such proportions as to produce a flux having the characteristics of English Cornwall stone having a silica content of 70–74%, alumina of 15–17%, potash of 2.5–4.5%, soda of 2.5–4.5%, and lime of 1–3%, and having a $Fe_2O_3$ content of less than .1%.

7. A ceramic flux composition comprising partially kaolinized pegmatite, flint, and feldspar and having a silica content of 70–74%, alumina 15–17%, potash 2.5–4.5%, and soda 2.5–4.5%.

8. A ceramic flux composition comprising partially kaolinized pegmatite, flint, and feldspar and having a silica content of 70–74%, alumina 15–17%, potash 2.5–4.5%, soda 2.5–4.5%, and less than .1% $Fe_2O_3$.

9. A ceramic flux composition comprising partially kaolinized pegmatite, flint, feldspar, and calcium carbonate and having a silica content of 70–74%, alumina 15–17%, potash 2.5–4.5%, soda 2.5–4.5%, and lime 1–3%.

JOSEPH H. WEIS.